United States Patent [19]

Oh et al.

[11] Patent Number: 5,686,956
[45] Date of Patent: Nov. 11, 1997

[54] OBJECT-BY BACKGROUND INFORMATION CODING APPARATUS AND METHOD

[75] Inventors: Seong-Jun Oh; Sung-Moon Chun; Joo-Hee Moon; Jae-Kyoon Kim, all of Seoul, Rep. of Korea

[73] Assignee: Hyundai Electronics Industries Co., Ltd., Rep. of Korea

[21] Appl. No.: 478,918

[22] Filed: Jun. 7, 1995

[30] Foreign Application Priority Data

Dec. 28, 1994 [KR] Rep. of Korea ............... 94-38016

[51] Int. Cl.⁶ .................. H04N 7/14; H04N 7/26
[52] U.S. Cl. .................. 348/19; 348/416; 348/426
[58] Field of Search ............... 348/17, 19, 413, 348/415, 416, 426, 399, 407; H04N 7/12, 7/13, 7/24, 7/26

[56] References Cited

U.S. PATENT DOCUMENTS

| | | |
|---|---|---|
| 5,202,764 | 4/1993 | Ida et al. . |
| 5,258,836 | 11/1993 | Murata ................... 348/19 |
| 5,282,037 | 1/1994 | Eguchi et al. . |
| 5,329,375 | 7/1994 | Juri et al. . |
| 5,347,311 | 9/1994 | Golin ................... 348/416 |
| 5,371,602 | 12/1994 | Tsuboi et al. . |
| 5,440,350 | 8/1995 | Golin ................... 348/416 |
| 5,519,436 | 5/1996 | Munson ................... 348/19 |

Primary Examiner—Victor R. Kostak
Attorney, Agent, or Firm—David M. Klein; Bryan Cave LLP

[57] ABSTRACT

An object based background information coding apparatus and method for an MPEG-4 system codes background images for effectively compressing image data corresponding to an MPEG-4 profile and for compensating the background information without errors. The apparatus includes a first region extraction circuit for extracting a changed region using a motion vector obtained from a current input image and an image inputted after the current image; a second region extraction circuit for extracting an uncovered region from the input image of the first region extraction circuit; an uncovered background extracting circuit for extracting uncovered background information from the changed region information extracted from the first region extraction circuit; a background memory storing region information of the first and second region extraction circuits; a surrounding value compensation circuit for compensating uncovered background information of the uncovered background extracting circuit for a surrounding value of the background memory; a background synthesizing circuit for uncovered background information compensated by the surrounding value compensation circuit and the background information of the memory; an error region extracting circuit for extracting an error region from uncovered background information synthesized by the background synthesizing circuit; a sampling circuit for sampling an extracted error region information; and a differential pulse code modulation circuit for differential-pulse-code-modulating uncovered error region information sampled by the sampling circuit.

13 Claims, 6 Drawing Sheets

OBJECT-BY BACKGROUND INFORMATION CODING APPARATUS AND METHOD

BACKGROUND OF THE INVENTION

1. Field of the Invention

The present invention relates generally to an object based background information coding apparatus and method for a Motion Picture Expert Group-4 (hereinafter "MPEG-4") system, and more particularly to an improved object based background information coding apparatus and method capable of advantageously coding background data using a memory for compressing image data corresponding to an MPEG-4 profile and for compensating background information without errors.

2. Description of the Conventional Art

Generally, MPEG-4 is used for compressing and reproducing moving images using a spatial correlation of the images. It uses a Discrete Cosine Transform (hereinafter "DCT") to eliminate redundancies in the image, and performs motion compensation.

Referring to FIGS. 1A and 1B, in MPEG-4, images are classified into three types: I-frame images, P-frame images, and B-frame images. In I-frame type images, the images are coded using a discrete cosine transform circuit 106 with no prediction of motion. In P-frame type images, motion is predicted only in the forward direction. In B-frame type images, motion is predicted in both forward and backward directions.

An image at a first input terminal 101 is reconstructed by a first frame reconstruction circuit 102. The motion of the image outputted from first frame reconstruction circuit 102 is predicted by a motion prediction circuit 122. A first motion compensation circuit 121 performs motion compensation using a motion vector 123. An inter/intra analyzing circuit 124 determines whether a macro block being processed is in an Inter Mode, which is a motion compensation mode, or an Intra Mode, which performs a discrete cosine transform without a motion compensation, and controls a first switching circuit 125 accordingly.

The image outputted from first frame reconstruction circuit 102 is outputted to a subtractor 103, which produces a differential image. A frame/field analyzing circuit 104 determines a discrete cosine transform type for the image. A frame/field formatting circuit 105 converts the image data based upon a cosine type determined by frame/field analyzing circuit 104.

The output of the frame/field formatting circuit 105 is converted to a frequency component signal by a discrete cosine transform circuit 106. The discrete cosine-converted frequency component signal is quantized by a quantization circuit 107 and inputted to a zig-zag scan conversion circuit 108. The quantized coefficient value outputted from quantization circuit 107 is scanned in a zig-zag scan by zig-zag scan conversion circuit 108. The output thereof is detected by run-and-fixed length decoder 109 as zero-runs and pairs of levels.

Quantization circuit 107 receives a control signal in accordance with the state of a first buffer circuit 110. If a large number of bit arrays are stored in first buffer circuit 110, the quantization control circuit reduces the number of bits by increasing a quantization scale value. If a small number of bit arrays are stored in first buffer circuit 110, the quantization scale value is decreased and the number of bits in first buffer circuit 110 thereby increases.

The run and level data obtained by zig-zag scan conversion circuit 108 is converted into a bit array corresponding to an MPEG-4 main profile along with additional information such as motion vector 123, and is then outputted to an output terminal 126 at a predetermined bit rate.

In addition to the foregoing, the output of zig-zag scan conversion circuit 108 is decoded through a first inverse zig-zag scan conversion circuit 112, a first inverse quantization circuit 113, a first inverse discrete cosine transform circuit 114, a first inverse frame/field formatting circuit 115, and the decoded output signal is added to a motion-compensated image by a first adder 116 and is thereby recovered.

The recovered images are stored in a first backward reference image memory 120 by a second switching circuit 117 for use in motion prediction and motion compensation, depending upon the coding type of an image received through a second input terminal 18. The stored images are also moved to a first forward prediction reference image memory 119 for when I-frame image or P-frame images are coded.

FIG. 2 shows a conventional MPEG-4 video decoder for recovering an MPEG-4 bit stream for display on a monitor. A bit stream outputted from a third input terminal 201 is stored in a second buffer circuit 202. A run-and-fixed length decoder 203 decodes information about the image, such as discrete cosine transform coefficients, motion vectors, intra/inter mode, and coding type.

The decoded discrete cosine transform coefficient information is recovered by a second inverse zig-zag scan conversion circuit 204. For I-frame images (intra mode), the information is recovered into an image through a second quantization circuit 205 and a second inverse frame/field formatting circuit 207. For P-frame and B-frame images (inter mode) the information is recovered into a differential image.

The recovered differential image is added to a motion compensation image by an adder 208 and is recovered into an image by a second frame reconstruction circuit 209. The image is then outputted to an output terminal 218 for display.

The recovered image is stored in a second backward prediction reference image memory 215 through a fourth switching circuit 216 in case the coding type of an image input through a sixth input terminal 217 is a B-type image, and is moved from second backward prediction reference image memory 215 to a second forward prediction reference image memory 214 for when an I-frame image or P-frame image is decoded.

The second motion-compensation circuit 212 performs motion-compensation using a motion vector outputted from a fifth input terminal 213, which is obtained by run-and-fixed length decoder 203. The motion image compensated by the second motion compensating circuit 212 is transferred to a second adder 208 through a third switching circuit 210 for processing when an inter mode is detected at terminal 211 as determined by run-and-fixed length decoder 203.

Conventional MPEG-4 video coders and decoders are disadvantageous in that the images produced by such systems are of low quality because the compressed image data transferred in a coded form is simply recovered to an original image data.

SUMMARY OF THE INVENTION

Accordingly, it is an object of the present invention to provide an object based background information coding apparatus and method which overcomes the problems encountered in conventional object based background information coding systems.

It is another object of the present invention to provide an improved object based background information coding apparatus and method capable of advantageously coding the background image using a memory for compressing image data corresponding to an MPEG-4 profile and for compensating the background information without error.

To achieve these objects the present invention provides an object based background information coding apparatus which includes a first region extraction circuit for extracting a changed region using a motion vector obtained by a current input image signal and a image signal inputted after the current input image signal; a second region extraction circuit for extracting an uncovered region from the input image signal of the first region extraction circuit; an uncovered background extracting circuit for extracting uncovered background information from the changed region information extracted from the first region extraction circuit using the motion vector; a background memory for storing region information of the first and second region extraction circuits; a surrounding value compensation circuit for compensating uncovered background information of the uncovered background extracting circuit for a surrounding value of the background memory; a background synthesizing circuit for uncovered background information compensated by the surrounding value compensation circuit and the background information of the memory; an error region extracting circuit for extracting an error region from uncovered background information synthesized by the background synthesizing circuit; a sampling circuit for sampling extracted error region information; and a differential pulse code modulation circuit for differential-pulse-code-modulating uncovered error region information sampled by the sampling circuit and for transmitting the modulated information to a decoder.

The present invention also provides an object based background information coding method which includes the following steps: In a first step, extracting a motion vector using a current input image signal and a image signal inputted therein after the current input image signal; in a second step, extracting changed region information and unchanged region information using a motion vector extracted in the first step; in a third step, extracting uncovered background using a motion vector with a changed region signal extracted in the second step; in a fourth step, updating the background information of a changed region and unchanged region; in a fifth step, compensating an uncovered background information of the third step for a surrounding value of the stored background information; in a sixth step, synthesizing uncovered background information compensated in the fifth step and the background information stored in the fourth step; and in a seventh step, extracting an uncovered error background region synthesized in the sixth step, sampling the extracted uncovered error background region, and differential-pulse code-modulating the sampled uncovered error background region.

DETAILED DESCRIPTION OF THE INVENTION

Figure 1A:
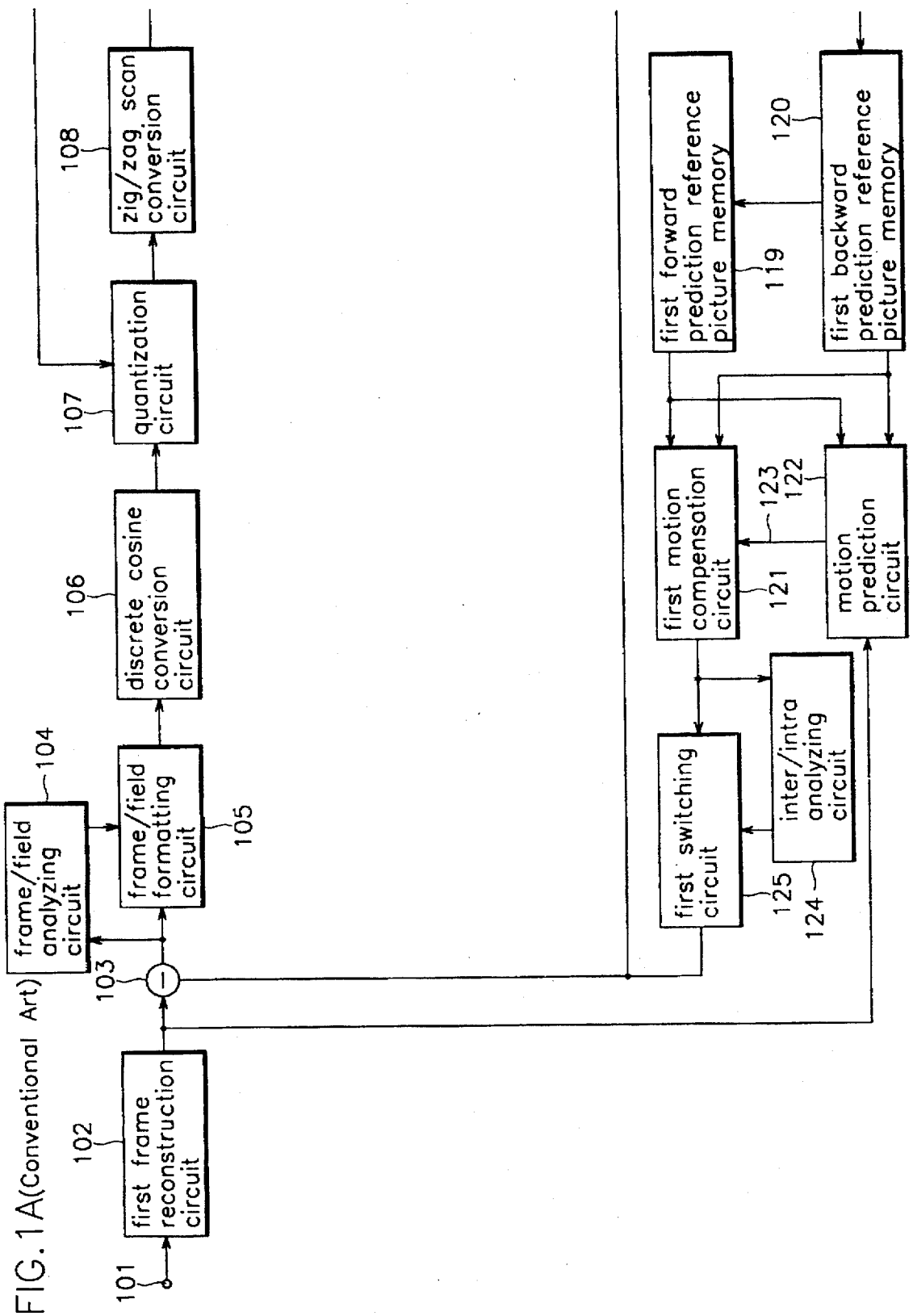
FIGS. 1A and 1B are block diagrams of a conventional MPEG-4 video coder system.
Figure 1B:
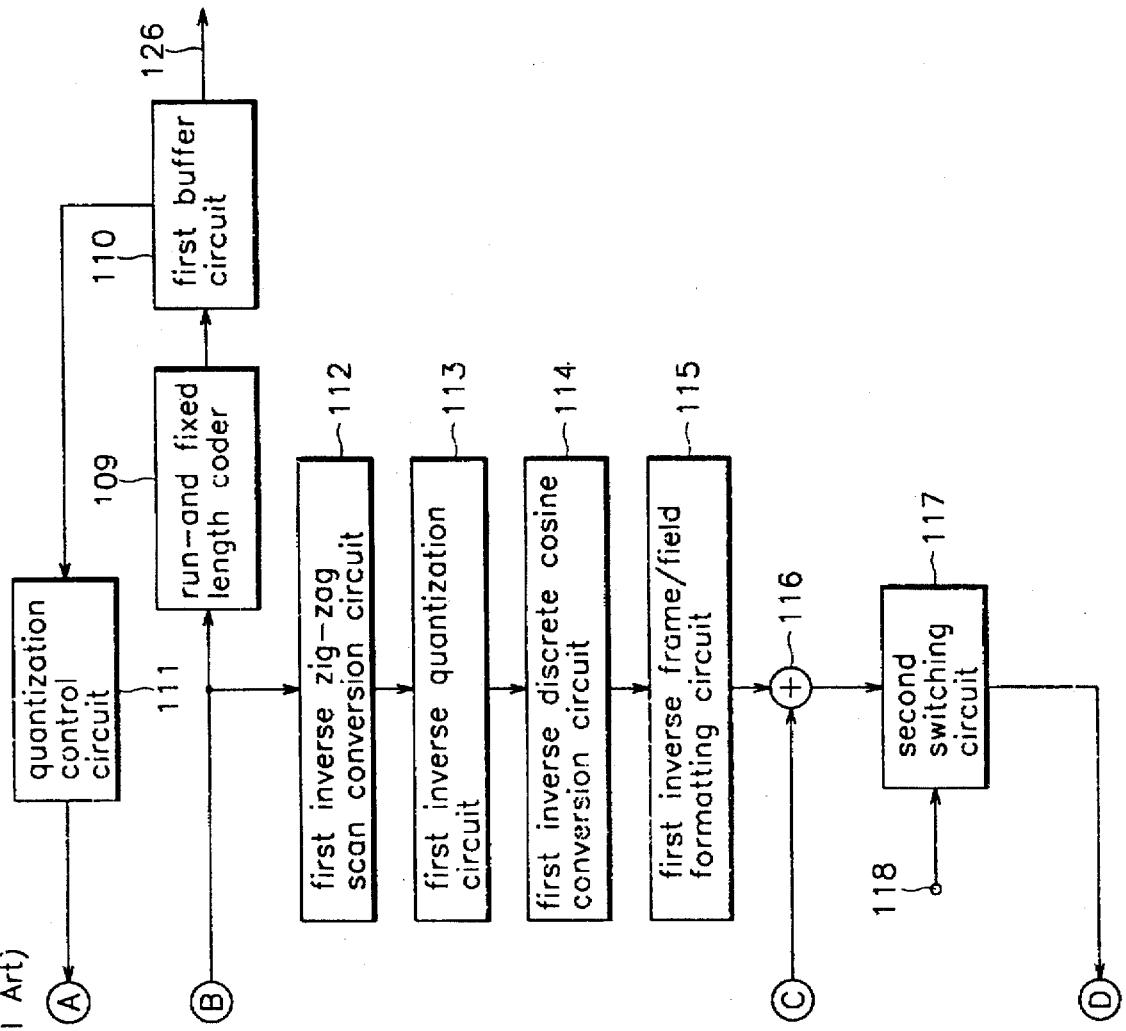
Figure 2:
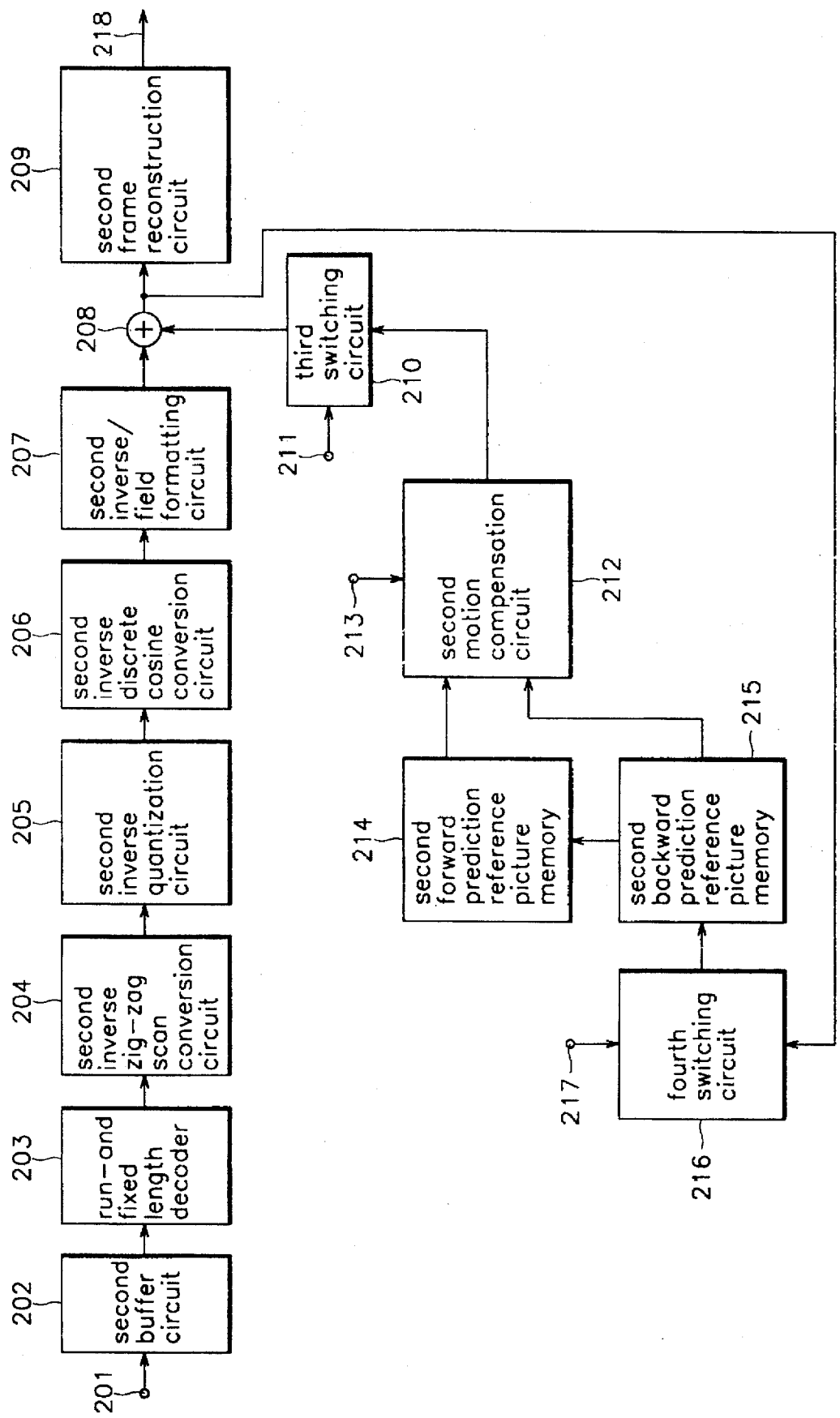
FIG. 2 is a block diagram of a conventional MPEG-4 video decoder system.
Figure 3:
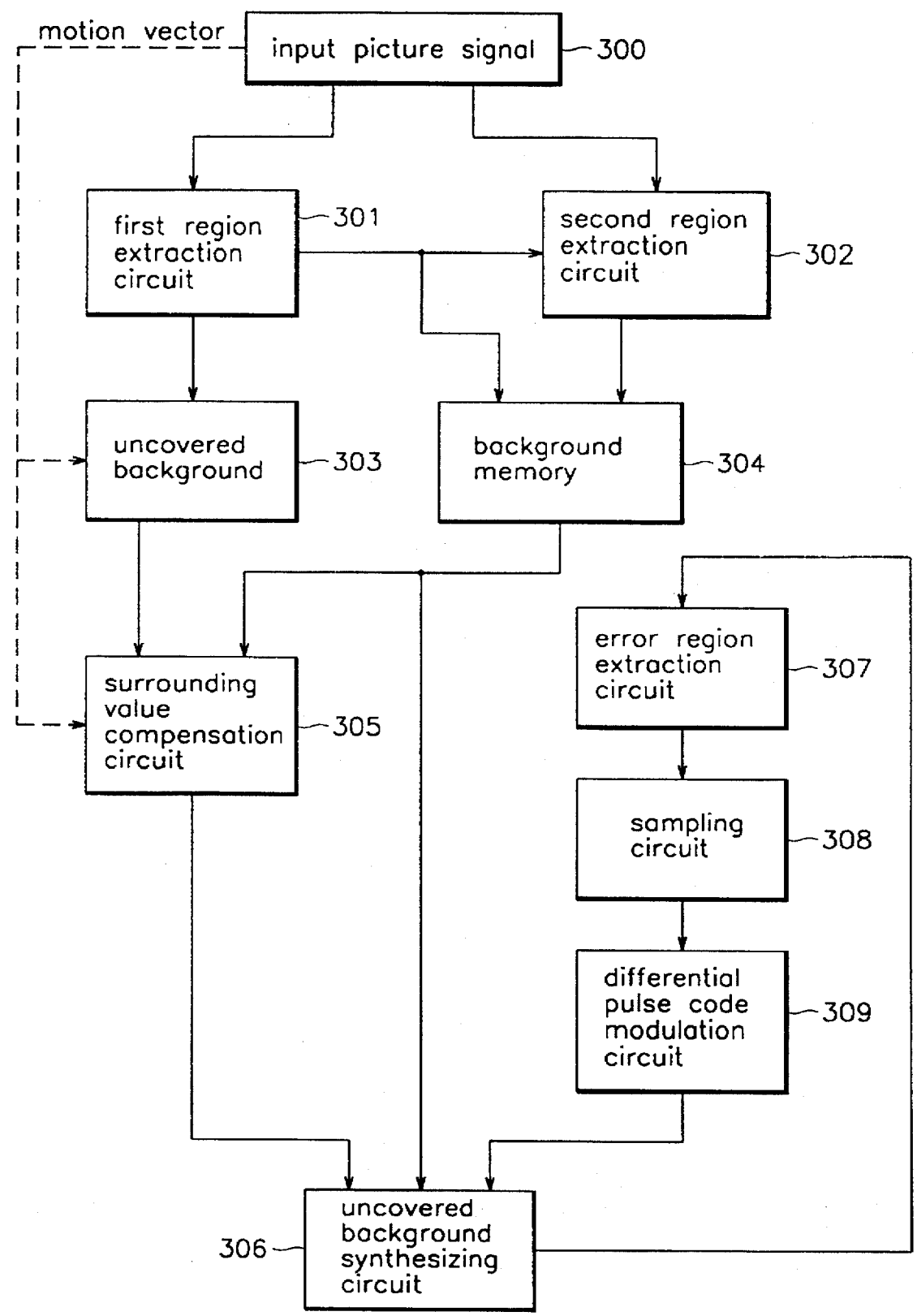
FIG. 3 is a block diagram of an object based background information coding apparatus in accordance with the present invention.
Figure 4:
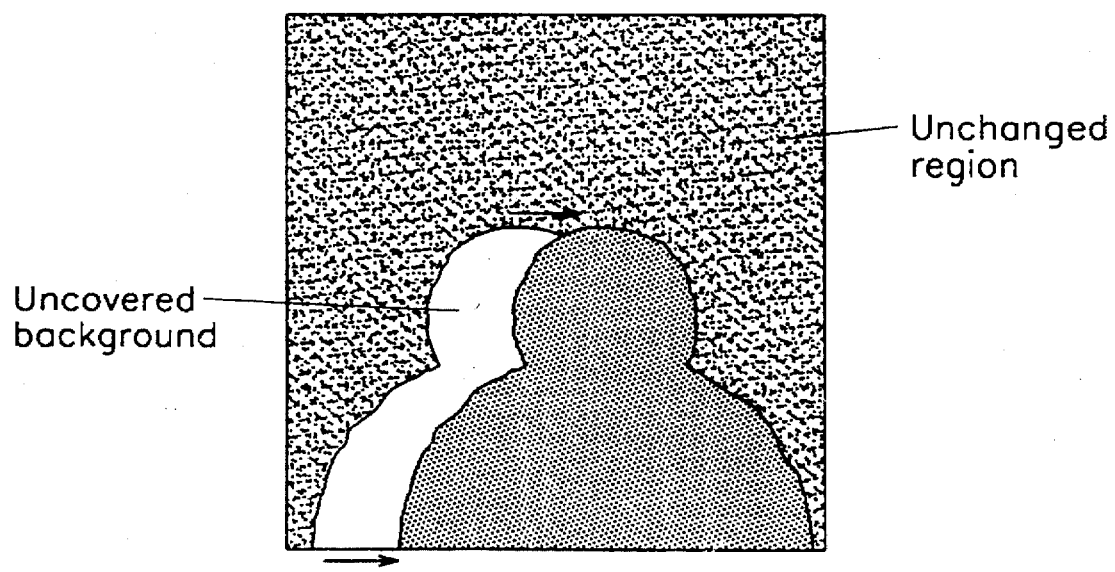
FIG. 4 is a view showing an unchanged region and uncovered background with respect to an input image.

Referring to FIG. 3, an object based background information coding apparatus for an MPEG-4 system according to the present invention determines a motion vector using an input image signal 300 and the next image signal. The region in which the motion vector exists is recognized as a changed region and the region information thereof is transmitted to a first region extraction circuit 301. The remaining region is recognized as an unchanged region and the region information thereof is transmitted to a second region extraction circuit 302.

Using a motion vector outputted from the first region extraction circuit 301, the regions in which pixel values do not exist in the initial input image signal are recognized as uncovered background, and the information thereof is stored in an uncovered background extraction circuit 303.

Background information for the image is stored in a background memory 304 using the output of second region extraction circuit 302. The size of background memory 304 is the same as the size of the image. Once the background information has been obtained, the changing background is thereafter updated in the background memory. The unchanged region from the initial image is stored in the background memory 304. The signal information on the moving portion of the image is not stored in background memory 304.

After the background memory has been initialized, a memory up-date process is performed to i) update the region information in background memory 304 by second region extraction circuit 302 after being recognized previously recognized as unchanged background during initialization, and ii) to transmit to background memory 304 when a changed region is changed to an unchanged region during image changes.

In order to synthesize the uncovered backgrounds, a surrounding value compensation circuit 305 compensates the surrounding values stored in background memory 304. At this time, if there is not presented a region being up-dated for a predetermined time, a pixel value is outputted from the background memory 304 whenever an uncovered background is made.

If the uncovered background synthesis circuit 306 is not correct, the error background is located from the error region extraction circuit 307, sampled by the sampling circuit 308 to a 4:1 ratio, and coded by the differential pulse code modulation circuit 309.

In operation, a motion vector is located from an initial input image signal 300 and the next image signal. At a receiving terminal, the next image signal is determined using the motion vector.

A region in which the motion vector exists is recognized as a changed region and the information about that region is transmitted to the first region extraction circuit 301. The remaining region is recognized as an unchanged region and the information about that region thereof is transmitted to the second region extraction circuit 302. In the motion vector, the changed region is divided into a region in which an object is moving and another region in which a motion vector exists due to uncovered background.

The problem is how to extract and compensate for the uncovered background. To resolve this problem, the uncovered background is located by recognizing a region in which a pixel value does not exist in the initial input image signal using region information extracted by the first region extraction circuit 301 and a motion vector. In addition, the background information of straight images can be obtained from the background memory 304.

The background memories 304 for both the receiving and transmitting terminals have to have the same contents, and the size of each memory should be the same as the size of the image.

The background information is obtained from the straight images and stored in background memory 304. Newly presented background is also placed in background memory 304. The signal values recognized as background in the straight images are stored in background memory 304.

Background information is obtained at the initial stage and at up-dates. At the initial stage, unchanged regions are extracted from the first image by the second region extracting circuit 302, and that information is stored in the background memory 304.

In the prior art coding method, the information about a first image is stored in the background memory at an initial stage. In the object based background coding method according to the present invention, since the changed region is extracted, the signal information about moving objects is not stored in the background memory.

Figure 5:
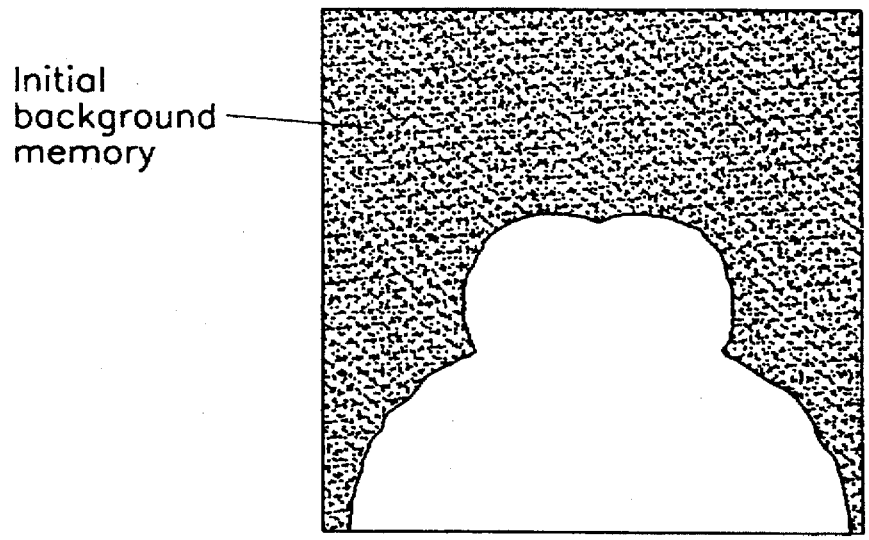
FIG. 5 is a view showing an initial state of the background information memory.

FIG. 5 shows a process by which the unchanged region in the first image is stored in the background memory 304 at the initial stage. After the initialization stage, the memory up-date process occurs in two situations. The first situation is to update the information to the background memory 304 using the second extracting circuit 302, which extracts unchanged region that is recognized as being unchanged background from the first stage. The second situation is to update the information in the background memory 304 for a region that was recognized as a changed region at the first stage but is later changed to the unchanged region.

In order to synthesize uncovered images, the surrounding values previously stored in background memory 304 are compensated by the surrounding value compensating circuit 305.

Figure 6:
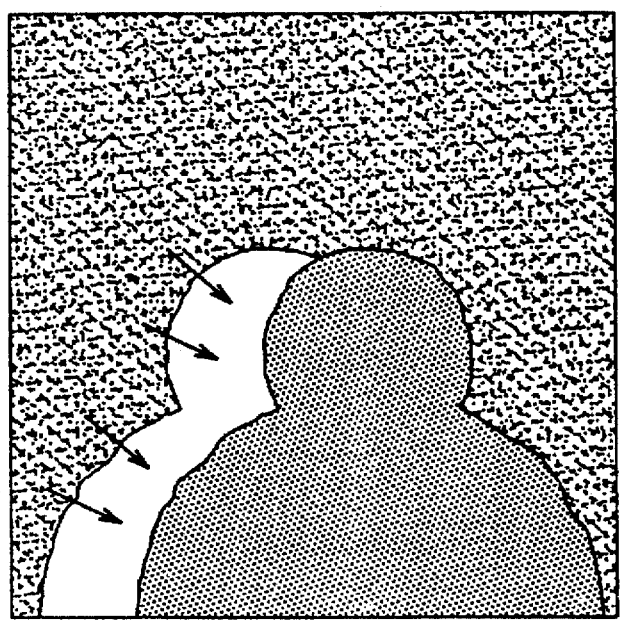
FIG. 6 is a view showing an example of using surrounding values to fill an background uncovered from an initial background image.
Figure 7:
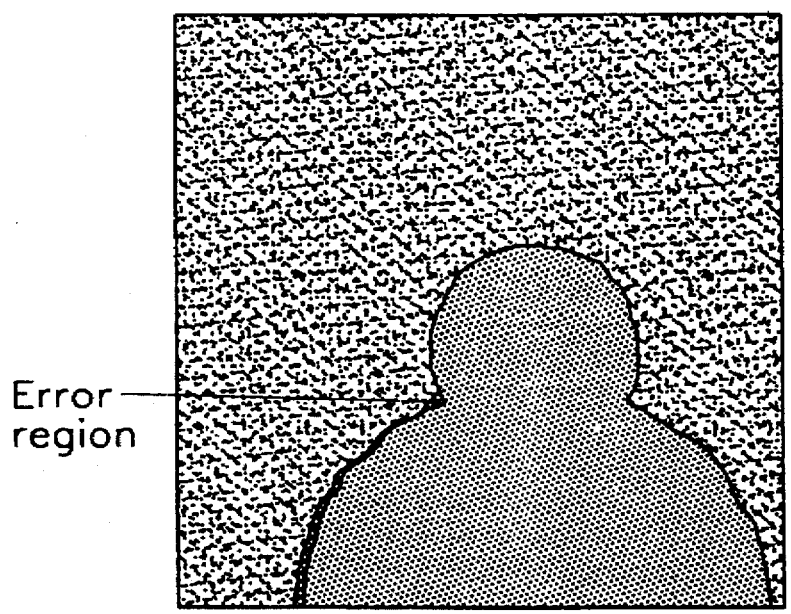
FIG. 7 is a view showing an error region after combining uncovered backgrounds.

FIG. 6 shows an example of using surrounding values to fill an uncovered background uncovered from an initial background image. FIG. 7 shows an error region after combining the uncovered backgrounds using the background memory. If there is no region in which the up-date process is performed for a predetermined time, a pixel value is obtained from the background memory 304 whenever the uncovered background is presented.

By the above described process, image signals can be transmitted while not transmitting each pixel of the background image. From time to time, the background information stored in the background memory 304 can not precisely be predicted when the brightness value of the background is changed or when the previous background information memory value is not correct. When background synthesis is not precisely performed by the background synthesis circuit 306, an error region obtained by the error region extracting circuit 307 is identified, the signal corresponding to the error region is sampled by sampling circuit 308 at a 4:1 ratio, and is then transmitted to differential pulse code modulation circuit 309. Differential pulse code modulation circuit 309 differential-pulse-code-modulates the error region information of the uncovered background and transmits this information to background synthesis circuit 306.

As described above, the present invention codes and transmits, without errors, background memory, surrounding values, and differential pulse modulation so that background imagery is advantageously coded using a memory for compressing the image data corresponding to an MPEG-4 profile without errors.

What is claimed is:

1. An object based background information coding apparatus which comprises:

first region extraction means for extracting a changed region using a motion vector obtained by a current input image signal and an image signal inputted therein after the current input image signal;

second region extraction means for extracting an uncovered region from the input image signal of the first region extraction means;

uncovered background extracting means for extracting uncovered background information from the changed region information extracted from the first region extraction means using the motion vector;

background memory for storing region information of the first region extraction means and region information of the second region extraction means;

surrounding value compensation means for compensating the uncovered background information of the uncovered background extracting means for a surrounding value of the background memory;

background synthesizing means for an uncovered background information compensated by the surrounding value compensation means and the background information;

error region extracting means for extracting an error region from the uncovered background information synthesized by the background synthesizing means;

sampling means for sampling the extracted error region information; and differential pulse code modulation means for differential-pulse-code-modulating the uncovered error region information sampled by the sampling means and for transmitting the modulated information to a decoder.

2. The apparatus of claim 1 wherein the first region extraction means recognizes a region in which a motion vector exists as a changed region, recognizes the remaining region in which a motion vector does not exist as an unchanged region, and transmits the recognized information to the second region extracting means.

3. The apparatus of claim 1 wherein the uncovered background extracting means extracts uncovered background from a region in which a pixel value does not exist in the initial input image signal using the motion vector with the changed region information of the first region extraction means.

4. The apparatus of claim 1 wherein the background memory has the same transmitting and receiving terminals, and the memory size thereof is the same as the size of the images.

5. An object based background information coding method for an MPEG-4 system comprising the steps of:

i) extracting a motion vector from a current input image signal and an image signal inputted therein after the current input image signal;

ii) extracting changed region information and unchanged region information using the motion vector extracted in the first step;

iii) extracting uncovered background using the motion vector extracted in the first step with the changed region signal extracted in the second step;

iv) updating the background information of changed regions and unchanged regions;

v) compensating uncovered background information of the third step for a surrounding value of the stored background information;

vi) synthesizing uncovered background information compensated in the fifth step and the background information stored in the fourth step; and vii) extracting uncovered error background region synthesized in the sixth step, sampling the extracted uncovered error background region, and differential pulse-code-modulating the sampled uncovered error background region.

6. The method of claim 5 wherein the second step comprises extracting a region in which the motion vector exists as a changed region and the remaining region as an unchanged region.

7. The method of claim 5 wherein the third step comprises recognizing a region in which an initial pixel value does not exist in the initial input image signal as an uncovered region using the motion vector with the changed region information.

8. The method of claim 5 wherein the fourth step comprises obtaining the background information of straight images using the unchanged region information and storing the obtained background information in memory.

9. The method of claim 8 wherein the size of the memory is the same as the size of the images and has the same receiving and transmitting terminals.

10. The method of claim 5 wherein the size of the memory is the same as the size of the images and has the same receiving and transmitting terminals.

11. The method of claim 5 wherein the fourth step comprises storing unchanged region information and not storing signal values of moving objects.

12. The method of claim 5 wherein after an initialization process the fourth step comprises a sub-step of separating a region in which the background is recognized as an unchanged region and another region in which at the first stage the region is recognized as a changed region and after a predetermined time the region is recognized as an unchanged region.

13. The method of claim 5 wherein the sixth step comprises reading a pixel value from the stored background memory whenever an uncovered background signal is outputted when an updating region is not made for a certain amount of time.

\* \* \* \* \*

UNITED STATES PATENT AND TRADEMARK OFFICE
CERTIFICATE OF CORRECTION

PATENT NO : 5,686,956

DATED : November 11, 1997

INVENTOR(S) : Seong-Jun Oh

It is certified that error appears in the above-identified patent and that said Letters Patent are hereby corrected as shown below:

On Patent Cover Sheet, under Title:

Delete: "OBJECT-BY" Insert: --OBJECT BASED --

Signed and Sealed this

Tenth Day of February, 1998

BRUCE LEHMAN

*Attest:*

*Attesting Officer*　　　*Commissioner of Patents and Trademarks*